United States Patent
Wolfgang et al.

(10) Patent No.: US 8,165,764 B2
(45) Date of Patent: Apr. 24, 2012

(54) METHOD FOR CONTROLLING AN AUTOMATIC MULTI-STEP SHIFT TRANSMISSION

(75) Inventors: Werner Wolfgang, Ravensburg (DE); Maik Wuerthner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 104 days.

(21) Appl. No.: 12/676,659

(22) PCT Filed: Sep. 11, 2008

(86) PCT No.: PCT/EP2008/062016
§ 371 (c)(1), (2), (4) Date: Mar. 5, 2010

(87) PCT Pub. No.: WO2009/037171
PCT Pub. Date: Mar. 26, 2009

(65) Prior Publication Data
US 2011/0153173 A1    Jun. 23, 2011

(30) Foreign Application Priority Data
Sep. 18, 2007 (DE) .......................... 10 2007 044 434

(51) Int. Cl.
G06F 7/00 (2006.01)
G06F 17/00 (2006.01)
G06F 19/00 (2011.01)
(52) U.S. Cl. .......................................................... 701/58
(58) Field of Classification Search .................... 701/58, 701/65, 94
See application file for complete search history.

(56) References Cited

U.S. PATENT DOCUMENTS

| 4,354,236 | A | * | 10/1982 | Miki et al. ........................ 701/66 |
| 4,393,467 | A | * | 7/1983 | Miki et al. ........................ 701/66 |
| 4,648,291 | A | * | 3/1987 | Klatt et al. ....................... 477/119 |
| 4,713,764 | A | * | 12/1987 | Klatt ................................ 701/65 |
| 5,231,897 | A |   | 8/1993 | Morita |
| 5,803,865 | A |   | 9/1998 | Harada et al. |
| 5,868,214 | A | * | 2/1999 | Workman ........................ 180/179 |
| 6,098,002 | A |   | 8/2000 | Horiguchi et al. |
| 2008/0167161 | A1 | * | 7/2008 | Mitchell et al. .................. 477/94 |
| 2008/0228362 | A1 |   | 9/2008 | Muller et al. |
| 2010/0324793 | A1 | * | 12/2010 | Winkel ............................ 701/65 |

FOREIGN PATENT DOCUMENTS

| DE | 33 34 718 A1 | 4/1985 |
| DE | 44 40 706 A1 | 5/1996 |
| DE | 10 2005 031 764 A1 | 1/2007 |
| EP | 0 864 781 A1 | 9/1998 |

* cited by examiner

Primary Examiner — Mary Cheung
Assistant Examiner — Michael D Lang
(74) Attorney, Agent, or Firm — Davis & Bujold, P.L.L.C.

(57) ABSTRACT

A method of controlling an automatic transmission arranged in a vehicle between a drive motor and an axle drive of a drive axle or a transfer box such that the current road inclination is determined and, after driving onto a downhill stretch of road, to increase a braking action of the drive motor and/or a permanent brake, a shift to a lower gear is carried out and after a transition to a traction operation or after driving onto level ground, a shift to a higher gear is carried out. To improve transmission shifting behavior, when transitioning between a downhill stretch and level ground, it is provided that a function for detecting a downhill run-out is started and if a downhill run-out is detected, and a shift to a higher gear is carried out while still in a thrust operation before driving onto the level ground and/or before the transition to traction operation.

14 Claims, 2 Drawing Sheets

METHOD FOR CONTROLLING AN AUTOMATIC MULTI-STEP SHIFT TRANSMISSION

This application is a National Stage completion of PCT/EP2008/062016 filed Sep. 11, 2008, which claims priority from German patent application serial no. 10 2007 044 434.8 filed Sep. 18, 2007.

FIELD OF THE INVENTION

The invention concerns a method for controlling an automatic multi-step shift transmission arranged in a drivetrain of a motor vehicle, such as a utility vehicle, in the force flow between a drive motor, which is an internal combustion engine, and an axle drive of a drive axle or a transfer box, in which method the current road inclination is determined, and after driving onto a downhill stretch, to increase the braking action of the drive motor and/or that of a permanent brake a shift is made to a lower gear, and at the latest after a transition to traction operation or after driving onto level ground a shift is made to a higher gear.

BACKGROUND OF THE INVENTION

In the case of a motor vehicle having an automated multi-step shift transmission such as an automated change-speed transmission, an automated dual-clutch transmission or a converter automatic transmission, after driving onto a downward-sloping stretch a lower gear is engaged, to increase the speed of the drive motor which, after the transition to thrust operation, is operating in a switched-off thrust mode, i.e. without fuel injection. Owing to the higher speed of the drive motor, the drag torque and hence the braking action of the drive motor increase. Furthermore, the braking force produced on the driven wheels by the drag torque of the drive motor is additionally increased due to the higher transmission ratio of the lower gear.

If the motor vehicle has a permanent brake such as an electromagnetic or hydrodynamic retarder, as is usual in heavy utility vehicles, this too is additionally activated when driving on steep and/or longer downhill stretches, this being done manually by the driver or automatically by an electronic control unit. In the case of a permanent brake on the primary side, i.e. one arranged on the input shaft of the multi-step shift transmission, at the higher speed of the drive motor both its braking action and its braking capacity, which is limited by the cooling, increase. In contrast, with a permanent brake arranged on the secondary side, i.e. on the output shaft of the multi-step shift transmission, at the higher speed of the drive motor only its braking capacity increases provided that the cooling of the permanent brake is coupled with the cooling of the drive motor, as is the case for example with a secondary retarder of the type known as an 'intarder', where the oil circuit is coupled with that of the multi-step shift transmission and the cooling water circuit connected, via a heat exchanger, with the oil circuit is coupled with that of the drive motor. A corresponding automatic downshift takes place as a function of appropriate operating parameters such as the inclination of the road, the mass of the vehicle and the driver's braking intention.

A corresponding transmission control system is known from DE 33 34 718 A1. This transmission control system comprises devices for determining the inclination of the road (uphill or downhill inclination of the road), the mass of the vehicle, the engine torque, and a constant torque required for driving the motor vehicle without any acceleration. By means of a downhill gear assignment system an optimally adapted gear is assigned to each downhill road gradient, in which the vehicle can drive down the slope at constant travel speed without additional actuation of the service brakes, and in this the use of a permanent brake, if present, is taken into account. A shift to the optimum gear is either recommended to the driver, for example, by means of a corresponding best-gear indication, or initiated automatically. A shift to the optimum gear is blocked if, while driving downhill, the driver actuates the accelerator pedal or if the gradient has just become clearly smaller.

Furthermore, in U.S. Pat. No. 5,231,897 a corresponding control unit for an automatic transmission is known, in which the current driving resistance is calculated from the vehicle's acceleration and the torque of the drive motor. If the current driving resistance exceeds an upper, first limit value, uphill driving is recognized and an upshift is prevented. If the current driving resistance falls below a lower, second limit value, downhill driving is recognized and a downshift is carried out to provide a braking action by the drive motor.

In DE 44 40 706 C2 a method for controlling an automatic transmission is proposed, in accordance with which, from the detected road inclination and the determined road-stretch profile, an effective hill factor is determined which is used as an interpolation factor. When uphill driving is recognized, the shift characteristics currently used are determined by an interpolation between a shift characteristic for driving on level ground and a shift characteristic for driving on a steeply uphill road. If downhill driving is recognized, the shift characteristics currently used are determined by interpolation between a shift characteristic for driving on level ground and a shift characteristic for driving on a very steep downhill road.

According to the prior art an upshift only takes place after the transition to traction operation, i.e. when the driver actuates the accelerator pedal or when an active speed regulating unit has automatically switched on the fuel injection of the drive motor. As an exception, an upshift can be carried out automatically when driving on a downhill stretch as a protective shift if the speed of the drive motor has reached or exceeded a critical upper speed limit, for example if the vehicle has moved onto a very steep downhill stretch or because of a high vehicle mass. The disadvantage of an upshift that takes place only after moving onto level ground or after the transition to traction operation, is that the momentum of the motor vehicle, i.e. the driving force due to the slope, is used only insufficiently when moving off the slope to propel the motor vehicle while it is moving off the slope and at the beginning of the subsequent driving on level ground or on a new uphill stretch. Due to this, the thrust operation ends relatively early and fuel injection is switched on again, which results in unnecessarily high fuel consumption. Furthermore owing to the high engine speed caused by the lower gear, the noise level produced by the motor when moving off the slope is disadvantageously high.

SUMMARY OF THE INVENTION

Accordingly, the purpose of the present invention is to indicate a method for controlling an automatic multi-step shift transmission of the type mentioned at the start, by virtue of which the shifting behavior of the multi-step shift transmission during the run-out from a downward slope can be improved in relation to lower fuel consumption and less emission of noise.

According to the characteristics of the principal claim, the invention starts from a method for controlling an automatic multi-step shift transmission, which is arranged within a drivetrain of a motor vehicle, for example a utility vehicle, in the force flow between a drive motor, in the form of an internal combustion engine, and an axle drive of a drive axle or a transfer box, such that the current road inclination is determined and after driving onto a downhill stretch, to increase the braking action of the drive motor and/or a permanent brake, a shift is carried out to a lower gear and, at the latest after a transition to traction operation or after driving onto level ground a shift is carried out to a higher gear. Furthermore it is provided that at the latest after driving onto the downhill stretch and/or after the transition to thrust operation, a recognition function for determining run-out from downhill travel is started, and when downhill run-out is recognized, even before moving onto level ground and/or before the transition to traction operation, a shift to a higher gear takes place, i.e. a thrust upshift is carried out.

According to the characteristics of the principal claim, the invention starts from a method for controlling an automatic multi-step shift transmission, such as an automated change-speed transmission, an automated dual-clutch transmission or a converter automatic transmission, which is arranged within a drivetrain of a motor vehicle in the force flow between a drive motor, in the form of an internal combustion engine, and an axle drive of a drive axle or a transfer box, such that the current road inclination (upward or downward slope of the road) is determined and after driving onto a downhill stretch, to increase the braking action of the drive motor and/or a permanent brake in a lower gear, and at the latest after a transition to traction operation or after driving onto level ground, a shift is carried out to a higher gear. Furthermore it is provided that at the latest after driving onto the downhill stretch and/or after the transition to thrust operation a recognition function for determining a run-out from downhill travel is started, and when downhill run-out is recognized, already before moving onto level ground and/or before the transition to traction operation, a shift to a higher gear takes place during thrust operation, i.e. a thrust upshift is carried out.

Thus, a thrust upshift is carried out during the transition from downhill driving to driving on level ground. In this way the speed of the drive motor and of a primary retarder, if present, are reduced by the difference in transmission ratios between the previously engaged lower gear and the currently engaged higher gear. Besides reducing the noise emissions of the drive motor and the multi-step shift transmission, this results in a reduction of the drive motor's drag torque and of the braking torque of the primary retarder. Consequently, as the motor vehicle drives through the downhill run-out it accelerates at least slightly because of the overall smaller braking forces in thrust operation or is not so strongly braked on the subsequent level ground, so that compared with previous control processes the transition to traction operation when it then moves onto level ground takes place substantially later. Due to this, especially when the profile of the road being traveled frequently changes between hilly and level sections, considerable fuel savings can be achieved. Moreover, thanks to such automatically initiated upshifts, the driver does not have to keep selecting the optimum gear and can therefore concentrate better on observing the traffic situation.

To be able to detect the downhill run-out with greater reliability, the recognition function preferably comprises a first part-function for determining a downhill stretch and a second part-function for detecting level ground, such that the first part-function is initiated at the latest after driving onto the downhill stretch and/or after the transition to thrust operation, the first part-function ends and the second part-function is initiated if a downhill gradient is detected in the first part-function, and the second part-function ends and the shift to a higher gear takes place when level ground is detected by the second part-function.

This division of the recognition function into the two part-functions is based on the realization that there is a downhill run-out at the transition between a downhill stretch and level ground. If first a downhill stretch, whose road inclination $N_{FB}$ shows at most some fluctuations, and shortly thereafter a stretch of level ground whose road inclination $N_{FB}$ also fluctuates to a certain extent, are recognized with relative certainty, then the motor vehicle is certainly in a downhill run-out at the beginning of a level section and the thrust downshift can be carried out safely.

The first part-function, in which the observation of a downhill gradient, if there is one, takes place, is preferably structured such that except for the start and initialization steps (steps a and b), the following steps are carried out repeatedly in a fixed time cycle until a downhill gradient is detected:

a) Start of the first part-function (observation of a downhill gradient);

b) Setting of an observation counter $Z_{B/G}$ to a positive starting value $Z_{B/G\_0}$ ($Z_{B/G}=Z_{B/G\_0}>0$, initialization);

c) Determination of the current road inclination $N_{FB}$;

d) Determination of a current counter increment $I_{B/G}$ as a function of the current road inclination $N_{FB}$ ($I_{B/G}=f(N_{FB})$), such that an uphill road ($N_{FB}>0$) gives a positive counter increment ($I_{B/G}>0$), a level stretch ($N_{FB}\approx 0$) gives a zero counter increment ($I_{B/G}>0$) and a downhill road ($N_{FB}<0$) gives a negative counter increment ($I_{B/G}<0$);

e) Addition of the counter increment $I_{B/G}$ to the observation counter $Z_{B/G}$ ($Z_{B/G}=Z_{B/G}+I_{B/G}$);

f) End of the first part-function when the observation counter $Z_{B/G}$ reaches or has fallen below the value zero ($Z_{B/G}\leq 0$, downhill gradient is regarded as being recognized).

The second part-function, in which the observation of a level stretch, if present, takes place, is preferably structured similarly such that except for the starting and initialization steps (steps g and h), the following steps are carried out repeatedly in a fixed time cycle until the presence of a level stretch is detected:

g) Start of the second part-function (observation of the presence of a level stretch);

h) Setting of an observation counter $Z_{B/E}$ to a positive starting value $Z_{B/E\_0}$ ($Z_{B/E}=Z_{B/E\_0}>0$, initialization);

i) Determination of the current road inclination $N_{FB}$;

j) Determination of a current counter increment $I_{B/E}$ as a function of the current road inclination $N_{FB}$ ($I_{B/E}=f(N_{FB})$), such that a road inclination $N_{FB}$ whose absolute value is outside an inclination limit value $\pm N_{Gr}$ close to zero or in a limit value range related thereto ($|N_{FB}|>|\pm N_{GR}|$) gives a positive counter increment ($I_{B/E}>0$), an absolute road inclination $N_{FB}$ approximately equal to the said inclination limit value $\pm N_{Gr}$ ($|N_{FB}|\approx|\pm N_{Gr}|$) gives a zero increment ($I_{B/E}\approx 0$) and an absolute road inclination $N_{FB}$ that is within the inclination limit value or the limit value range related thereto ($|N_{FB}|<|\pm N_{Gr}|$) gives a negative counter increment ($I_{B/E}<0$);

k) Addition of the counter increment $I_{B/E}$ to the observation counter $Z_{B/E}$ ($Z_{B/E}=Z_{B/E}+I_{B/E}$);

l) End of the second part-function, when the observation counter $Z_{B/E}$ reaches or has fallen below the value zero ($Z_{B/E}\leq 0$, level ground is considered to have been recognized).

Thus, in both part-functions the observation counter $Z_{B/G}$ or $Z_{B/E}$ that begins with a respective positive starting value $Z_{B/G\_0}$ or $Z_{B/E\_0}$ is reduced step by step when, in the first part-function, the road inclination $N_{FB}$ is negative, i.e. downhill ($N_{FB}<0 \rightarrow I_{B/G}<0$) and when, in the second part-function the road inclination $N_{FB}$ is approximately zero, i.e. the road is level ($N_{FB} \approx 0 \rightarrow I_{B/E} < 0$). On the other hand, if there are deviations from the respective ideal forms of the road inclinations $N_{FB}$, then the respective counter increment becomes larger than or equal to zero ($N_{FB} \geq 0 \rightarrow I_{B/G} \geq 0$; $N_{FB} \neq 0 \rightarrow I_{B/E} \geq 0$). The respective observation counter $Z_{B/G}$ or $Z_{B/E}$ is then either increased step by step again, or its value remains constant.

In this way the input signal formed by the road inclination $N_{FB}$ is implicitly smoothed, i.e. subjected to low-pass filtering. The result achieved is that changes or fluctuations of the road inclination $N_{FB}$ that exist in practice cannot lead to an erroneous identification of a downhill slope or level ground, but rather, the downhill or level stretches are identified with great accuracy. Since the two part-functions take place successively in time, in each case identical variables can be used within the control program for the observation counters ($Z_{B/G}$, $Z_{B/E}$) and the counter increments ($I_{B/G}$, $I_{B/E}$).

The road inclination $N_{FB}$ can be determined for example by an inclination sensor arrangement. But since this entails substantial sensor costs and computation effort to determine the road inclination $N_{FB}$ with sufficiently high accuracy, the road inclination $N_{FB}$ is preferably calculated from the available values of the current drag torque $M_M < 0$ of the drive motor, the current braking torque $M_{DBr}$ of an activated permanent brake, the current travel speed $v_F$ and the current driving acceleration $a_F$ using the movement equation known per se.

The movement equation of a motor vehicle can be written in the general form:

$$m_{Fzg} * a_F = F_{Zug} - F_{DBr} - F_W$$

in which $m_{Fzg}$ is the vehicle mass of the motor vehicle, $a_F$ is the driving acceleration of the motor vehicle, $F_{Zug}$ is the traction force transmitted from the drive motor to the drive wheels, which is negative during thrust operation, $F_{DBr}$ is the braking force transmitted from a permanent brake (retarder) to the drive wheels, and $F_W$ is the driving resistance.

During steady-state, i.e. non-accelerating driving of the motor vehicle the movement equation is simplified to:

$$0 = F_{Zug} - F_{DBr} - F_W$$

With the drag torque $M_M$ of the drive motor, in this case acting as a negative drive torque, the transmission ratio $i_{Ha}$ of the drive axle, the dynamic tire radius $r_{dyn}$ of the drive wheels, the transmission ratio $i_G$ of the multi-step shift transmission in the gear engaged and the efficiency $\eta_{Atr}$ of the drivetrain, the traction force $F_{zug}$ is given by the equation:

$$F_{Zug} = M_M * i_{Ha} / r_{dyn} * i_G * \eta_{Atr}.$$

Assuming that a primary retarder is positioned on the input shaft of the multi-step shift transmission as a permanent brake, the braking force $F_{DBr}$ of the permanent brake in terms of its braking torqued $M_{DBr}$ can be written:

$$F_{DBr} = M_{DBr} * i_{Ha} / r_{dyn} * i_G * \eta_{Atr}.$$

The driving resistance $F_W$ is composed additively of the air resistance $F_{Luft}$, the rolling resistance $F_{Roll}$ and the resistance due to inclination $F_{Steig}$, which when driving downhill is negative, i.e. a propelling force, according to the equation:

$$F_W = F_{Luft} + F_{Roll} + F_{Steig}.$$

Using the air resistance coefficient $c_W$, the cross-section area $A_{Fzq}$ of the motor vehicle, the air density $\rho$ and the movement speed $v_F$ of the motor vehicle, the air resistance $F_{Luft}$ is given by:

$$F_{Luft} = c_W * A_{Fzg} * \rho/2 * v_F^2.$$

The rolling resistance $F_{Roll}$ can be obtained, using the rolling resistance coefficient $f_{roll}$, the acceleration due to gravity g and the longitudinal inclination angle $\alpha_{FB}$ of the road, from:

$$F_{Roll} = f_{Roll} * M_{Fzg} * g * \cos(\alpha_{FB})$$

Correspondingly, the resistance due to inclination $F_{Steig}$ is obtained from:

$$F_{Steig} = m_{Fzg} * g * \sin(\alpha_{FB})$$

and while driving downhill as considered here, the negative sign of the inclination resistance $F_{Steig}$ arises because of the sign of the longitudinal inclination angle $\alpha_{FB}$ of the road, which is negative when moving downhill. Thus one obtains the equation:

$$0 = (M_M - M_{DBr}) * i_{Ha} / r_{dyn} * i_G * \eta_{Atr} - c_W * \eta_{Atr} * \rho/2 * v_F^2 - m_{Fzg} * g * (f_{Roll} * \cos(\alpha_{FB}) + \sin(\alpha_{FB})),$$

from which the road inclination $N_{FB}$ can be calculated using an approximation relationship for the sine and cosine of the longitudinal inclination angle $\alpha_{FB}$ or by an iteration process and in each case with the relation:

$$N_{FB}[\%] = 100 * \arctan(\alpha_{FB}[°]).$$

When a measured operating parameter with a low risk potential has temporarily reached or exceeded a critical limit value, the second part-function is expediently frozen or interrupted and the determination of the presence of a level road section is discontinued. When the operating parameter has thereafter fallen below the critical limit value again, the second part-function can be continued once more.

The second part-function can be frozen or not activated in a simple manner by using software means to set the counter increment $I_{B/E}$ to zero ($I_{B/E} = 0$) until the operating parameter concerned has again fallen below the critical limit value. In this way the observation counter $Z_{B/E}$ retains its last-reached value until then.

In this connection it is appropriate for the second part-function to be interrupted if the current braking torque $M_{DBr}$ of an activated permanent brake has exceeded a predetermined critical upper limit (for example 80%) in relation to the maximum braking capacity ($M_{DBr\_max}$) of the permanent brake. In this way the rotational speed-dependent braking capacity $M_{DBr\_max}$ of the permanent brake is not reduced by the thrust downshift provided for as such, and on a downhill stretch that may come after the recognized level stretch a capacity reserve of the permanent brake sufficiently large for a more marked slowing down of the motor vehicle if that is necessary remains available.

Likewise, it is expedient for the second part-function to be interrupted if, by means of an activated distance regulation system (ACC=adaptive cruise control) a motor vehicle driving ahead at a speed $v_{F/a}$ and at a distance $\Delta s$ is detected, such that the time $\Delta t_s$ to catch up with it is shorter than a critical catch-up time $\Delta t_{krit}$ ($\Delta t_s = \Delta s/(v_F - v_{F/a}) < \Delta t_{krit}$). This suppresses a possible thrust upshift in order to avoid a too rapid and possibly dangerous approach to the motor vehicle driving in front, caused by the thrust upshift.

However, when the duration $\Delta t_{fr}$ of the interrupted status of the second part-function has reached or exceeded a predetermined duration limit $\Delta t_{Gr}$ ($\Delta t_{fr} \geq \Delta t_{Gr}$), it is expedient to discontinue the second part-function completely and, if the starting conditions recur, such as the presence of a downhill slope and/or of thrust operation of the drive motor, then to begin the first part-function afresh since in the interim larger changes of the operating conditions such as a more markedly changed road inclination $N_{FB}$ or a larger change of the driving speed $v_F$ may have taken place.

Likewise, the second part-function is advantageously discontinued and if the starting conditions recur, the first part-function is started afresh, if a measured operating parameter with high risk potential has changed substantially.

This is particularly the case if an unengaged forward gear or a shift of the multi-step shift transmission is detected when actuation of the service brakes is detected with reference to movement of the brake pedal $x_{BP}>0$ or with reference to a brake pressure increase $x_{Br}>0$, or when the drive motor is found to be in traction operation by virtue of a positive drive torque $M_M>0$. In such cases there exists an operating situation with manual control intervention by the driver or with automatic control intervention by the transmission control unit or by a speed regulation unit, in which a thrust downshift would be rather disadvantageous and is therefore not carried out for safety reasons.

BRIEF DESCRIPTION OF THE DRAWINGS

To clarify the invention, the description of a drawing is attached, which show.

DETAILED DESCRIPTION OF THE PREFERRED EMBODIMENTS

Figure 1:
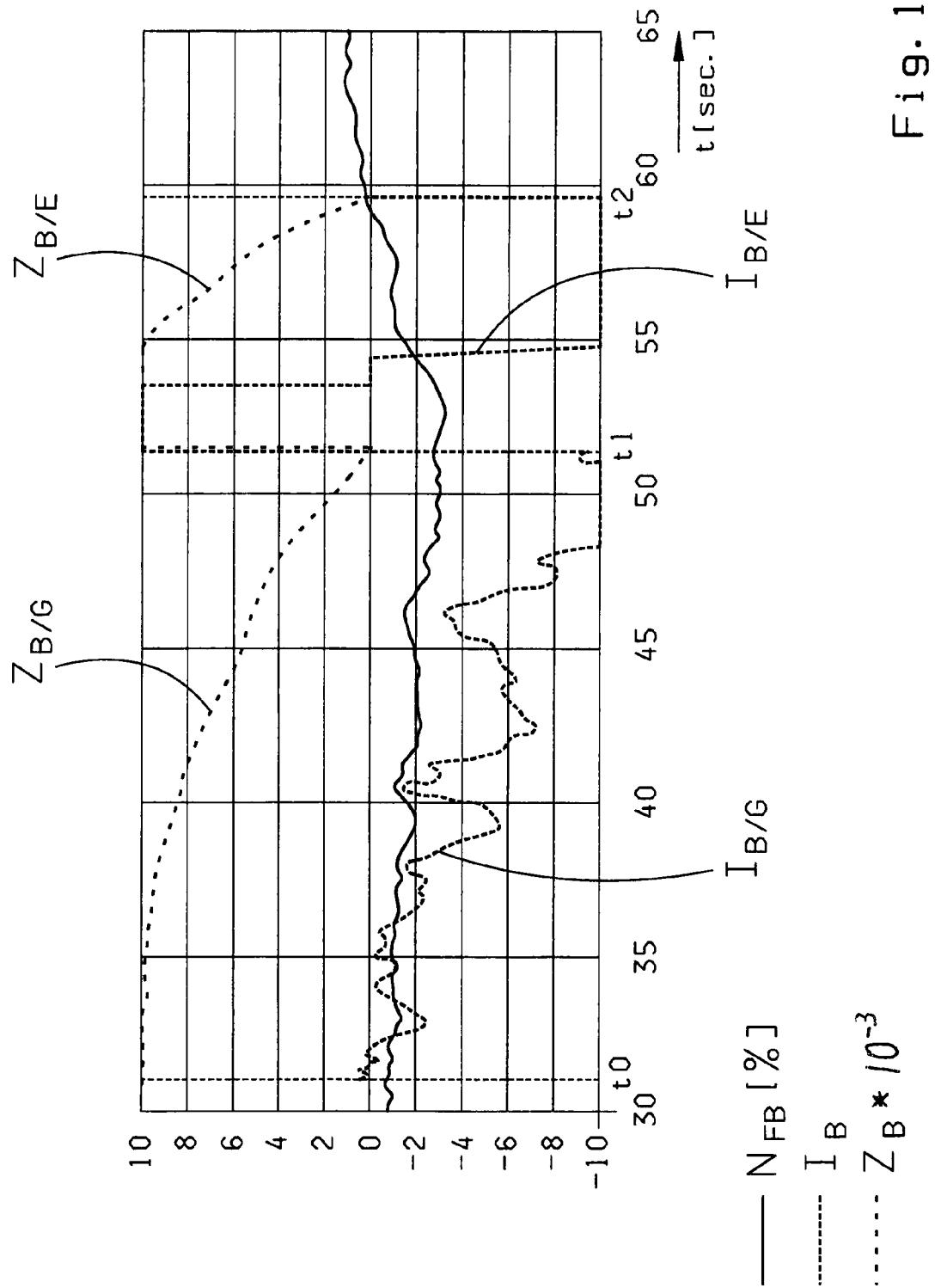
FIG. 1: Diagram showing the time variations of the road inclination, of an observation counter, and of a counter increment of a recognition function of the method according to the invention for determining a downhill run-out.

FIG. 1 shows the time variations determined during the driving operation of a motor vehicle, of a road inclination $N_{FB}$ preferably calculated from the current drag torque $M_M<0$ of the drive motor, the current braking torque $M_{DBr}$ of a permanent brake, the current driving speed $v_F$ and the current driving acceleration $a_F$ using the movement equation, that of an observation counter $Z_B$, and that of a counter increment $I_B$. The observation counter $Z_B$ and the counter increment $I_B$ are in each case part of a first part-function and a second part-function of a recognition function for detecting a downhill run-out.

The first part-function serves to detect a downhill gradient ($N_{FB}<0$) and is started at time t0 at which, for example, the starting conditions, namely a current downhill road gradient ($N_{FB}<0$) and/or a current thrust operation ($M_M<0$) of the drive motor, exist. The observation counter $Z_{B/G}$ begins with a positive initial value $Z_{B/G\_0}=10^3$ and is varied additively in steps, in the present case of 0.1 seconds, by the counter increment $I_{B/G}$ which is determined as a function of the road inclination $N_{FB}$ and can adopt values between −10 and +10.

Figure 2:
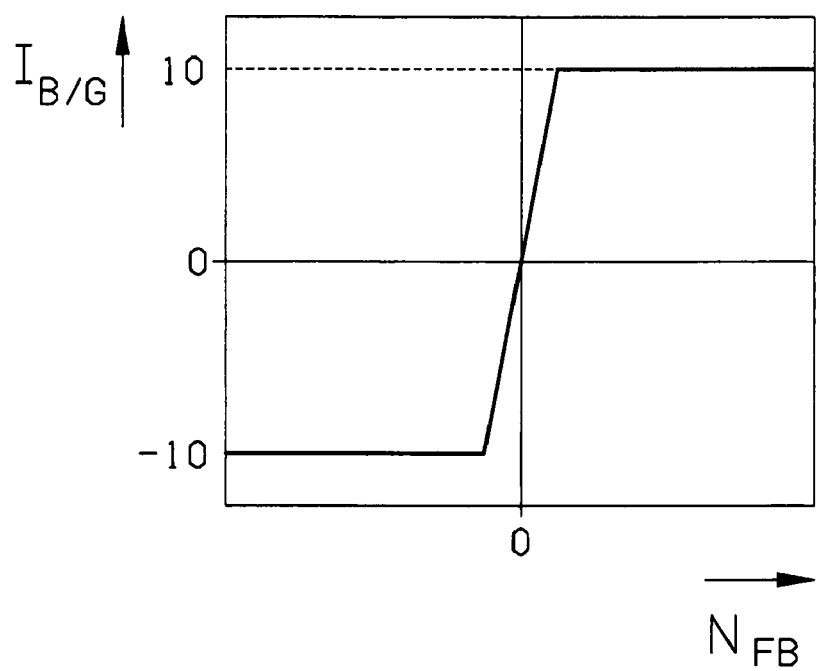
FIG. 2: Function for determining the counter increment in a first part-function of the recognition function according to FIG. 1.

The function used here for determining the counter increment $I_{B/G}$ is illustrated in FIG. 2. According to this, when the road inclination is negative $N_{FB}<0$, i.e. on a downhill slope, the counter increment $I_{B/G}$ adopts the value −10 and when the road inclination is positive $N_{FB}>0$, i.e. on an uphill slope, it adopts the value +10. Close to a road inclination $N_{FB}\approx0$, i.e. on level ground, the value of the counter increment $I_{B/G}$ jumps with a steep gradient from −10 to +10 and at a road gradient of exactly $N_{FB}=0$ it adopts the value zero.

Owing to the downhill gradient ($N_{FB}<0$) that exists after time point t0 in FIG. 1, the counter increment $I_{B/G}$ first adopts negative values ($I_{B/G}<0$) so that the observation counter $Z_{B/G}$ is reduced step by step until, at time t1, it reaches zero. When the observation counter $Z_{B/G}$ has reached or fallen below zero ($Z_{B/G}\leq0$), it is concluded that the vehicle is driving downhill, so the first part-function ends and at time t1 or immediately thereafter the second part-function is started.

The second part-function serves to detect the beginning of a level section of the stretch traveled ($N_{FB}\approx0$) and in the present case uses the same variables $Z_B$ and $I_B$ as the first part-function. The observation counter $Z_{B/E}$ again starts with a positive initial value $Z_{B/E\_0}=10^3$ and is again changed additively in steps of 0.1 second by the counter increment $I_{B/E}$, which is also determined as a function of the road inclination $N_{FB}$ and can adopt values between −10 and +10.

Figure 3:
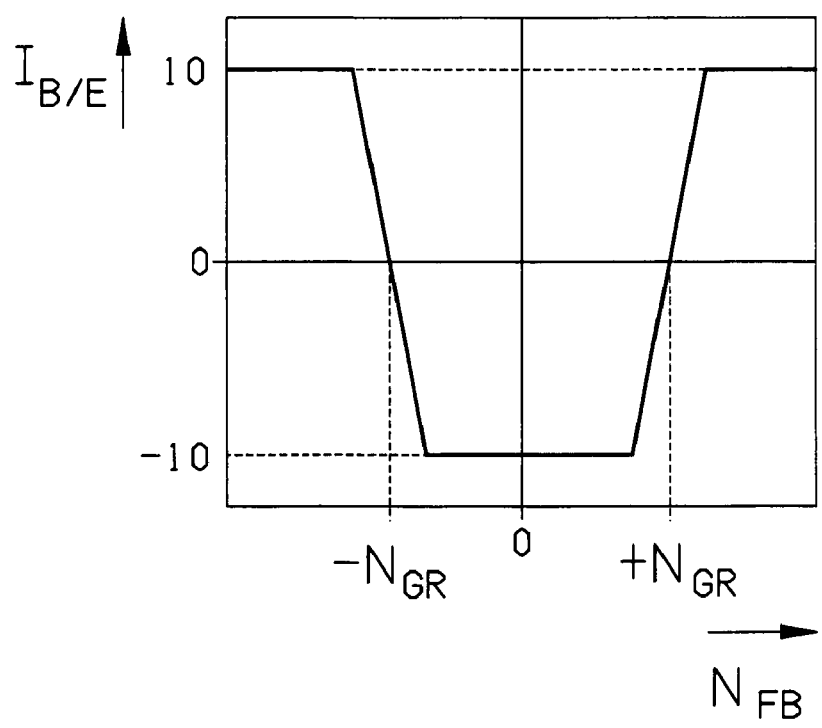
FIG. 3: Function for determining the counter increment in a second part-function of the recognition function according to FIG. 1.

However, the function used in the second part-function for determining the counter increment $I_{B/E}$ differs essentially from that of the first part-function, and is illustrated in FIG. 3. According to this, the counter increment $I_{B/E}$ adopts the value +10 in the case of road inclinations that lie outside an inclination limit value $\pm N_{Gr}$ or outside a limit value range ($|N_{FB}|>|\pm N_{Gr}|$) related thereto, and with road inclinations that are within the inclination limit value $\pm N_{Gr}$ or within a limit value range ($|N_{FB}|<|\pm N_{Gr}|$) it adopts the value −10. Close to the inclination limit value ($|N_{FB}|\approx|\pm N_{Gr}|$) the value of the counter increment $I_{B/E}$ jumps steeply from +10 to −106 or from −10 to +10, and at a road inclination of exactly $|N_{FB}|=|\pm N_{Gr}|$ it adopts the value zero.

Owing to a negative road gradient ($|N_{FB}|>|-N_{Gr}|$) whose absolute value is greater than the inclination limit value $-N_{Gr}$, which is at first encountered after the time point t1 in FIG. 1, the counter increment $I_{B/E}$ initially adopts the value +10 so that the observation counter $Z_{B/E}$ remains for the time being at its initial value $Z_{B/E\_0}=10^3$ used as an upper limit. But since thereafter the road gradient $N_{FB}$ decreases and eventually comes close to zero ($N_{FB}\approx0$), after passing through zero the counter increment $I_{B/E}$ changes to the value −10 which results in a step by step reduction of the observation counter $Z_{B/E}$. In this way the observation counter $Z_{B/E}$ reaches zero at time t2, and this is taken to mean that a level stretch or a downhill run-out has been detected. Consequently, the second part-function ends at time t2 and a thrust upshift is initiated.

This reduces the braking effect of the drive motor, so that the downhill driving force still present during the downhill run-out is used at least in part for propelling the motor vehicle during the downhill run-out and the beginning of the level stretch. Consequently the motor vehicle changes to traction operation later than was previously usual, and particularly when the road profile is hilly this results in substantial fuel savings.

INDEXES $a_F$ Vehicle acceleration
$A_{Fzg}$ Cross-sectional area
$c_W$ Air resistance coefficient
$F_{DBr}$ Braking force of a permanent brake
$F_{Luft}$ Air resistance
$f_{Roll}$ Rolling resistance coefficient
$F_{Roll}$ Rolling resistance
$F_{Steig}$ Resistance due to gradient
$F_W$ Driving resistance
$F_{Zug}$ Traction force of the drive motor
$F_W$ Driving resistance
g Acceleration due to gravity
$I_{B/E}$ Counter increment
$I_{B/G}$ Counter increment
$i_G$ Transmission ratio of the multi-step shift transmission
$i_{Ha}$ Transmission ratio of the drive axle $M_{DBr}$ Braking torque of a permanent brake
$M_{DBr\_max}$ Maximum braking capacity of a permanent brake
$M_M$ Drive torque, drag torque of the drive motor
$m_{Fzg}$ Mass of the vehicle
$N_{FB}$ Road inclination in %
$N_{Gr}$ Inclination limit value
$p_{Br}$ Brake pressure
$r_{dyn}$ Dynamic tire radius
t Time
t0 Time point
t1 Time point
t2 Time point
$v_F$ Driving speed of one's own motor vehicle
$v_{F/a}$ Driving speed of a motor vehicle driving in front
$x_{BP}$ Brake pedal deflection
$Z_B$ Observation counter
$Z_{B/E}$ Observation counter
$Z_{B/E\_0}$ Starting value of $Z_{B/E}$
$Z_{B/G}$ Observation counter
$Z_{B/G\_0}$ Starting value of $Z_{B/G}$
$\alpha_{FB}$ Road gradient [°], longitudinal gradient value
$\Delta s$ Distance
$\Delta t_{fr}$ Duration of the interrupted condition
$\Delta t_{Gr}$ Limit duration
$\Delta t_{krit}$ Critical catch-up time
$\Delta t_s$ Catch-up time
$\eta_{Atr}$ Efficiency of the drivetrain
$\rho$ Air density

The invention claimed is:

1. A method of controlling an automated multi-step shift transmission arranged in a drivetrain of a motor vehicle in the force flow between a drive motor and an axle drive of either a drive axle or a transfer box, the method comprising the steps of:
determining a current road inclination (NFB);
after driving onto a downhill stretch, carrying out a shift to a lower gear to increase braking action of at least one of the drive motor and a permanent brake,
starting a recognition function for detecting a downhill run-out at the latest after at least one of driving onto the downhill stretch and the transition to a thrust operation; and
when a downhill run-out is detected, carrying out a shift to a higher gear while still in the thrust operation (thrust upshift) before at least one of driving onto the level ground and the transition to the traction operation.

2. The method according to claim 1, further comprising the steps of:
defining the recognition function as a two part-function with a first part-function for detecting a downhill stretch and a second part-function for detecting level ground;
starting the first part-function at the latest after at least one of driving onto the downhill stretch and transitioning to the thrust operation;
ending the first part-function;
starting the second part-function if a downhill gradient is detected by the first part-function;
ending the second part-function; and
initiating the shift to a higher gear if a level stretch ground is detected by the second part-function.

3. The method according to claim 2, further comprising the steps of:
starting the first part-function (observation of a downhill gradient);
setting an observation counter (ZB/G) to a positive starting value (ZB/G_0 (ZB/G=ZB/G_0>0, initialization));
determining the current road inclination (NFB);
determining a current counter increment (IB/G) as a function of the current road inclination (NFB (IB/G=f (NFB))), such that an uphill road (NFB>0) gives a positive counter increment (IB/G>0), a level stretch of road (NFB≈0) gives a zero counter increment (IB/G≈0) and a downhill road (NFB<0) gives a negative counter increment (IB/G<0);
adding the counter increment (IB/G) to the observation counter (ZB/G (ZB/G=ZB/G+IB/G));
ending the first part-function when the observation counter (ZB/G) either reaches or falls below a value of zero (ZB/G≦0, downhill gradient is regarded as being recognized); and
repeating the steps of the first part-function (observation of the presence of a downhill gradient), except for the step of starting the first part-function and the step of setting the observation counter in a fixed time cycle until a downhill gradient is detected.

4. The method according to claim 2, further comprising the steps of:
starting the second part-function (observation of the presence of a level stretch);
setting a further observation counter (ZB/E) to a positive starting value (ZB/E_0 (ZB/E=ZB/E_0>0, initialization));
determining the current road inclination (NFB);
determining a further current counter increment (IB/E) as a function of the current road inclination (NFB (IB/E=f (NFB))), such that a road inclination (NFB) with an absolute value outside either an inclination limit value (±NGr) close to zero or within a limit value range related thereto (|NFB|>|±NGr|) gives a positive counter increment (IB/E>0), an absolute road inclination (NFB) approximately equal to the inclination limit value (±NGr (|NFB|≈|±NGr|)) gives a zero increment (IB/E=0) and an absolute road inclination (NFB) that is within either the inclination limit value or the limit value range related thereto (|NFB|<|±NGr|) gives a negative counter increment (IB/E<0);
adding the further counter increment (IB/E) to the further observation counter (ZB/E (ZB/E=ZB/E+IB/E));
ending the second part-function, when the further observation counter (ZB/E) one of reaches or falls below the value of zero (ZB/E≦0, level ground considered to have been recognized); and
repeating the steps of the second part-function (observation of the presence of a level stretch), except for the step of starting the second part-function and the step of setting the further observation counter in a fixed time cycle until a level stretch of road is detected.

5. The method according to claim 4, further comprising the steps of
interrupting the second part-function, if a measured operating parameter with a low risk potential one of temporarily reaches or exceeds a critical limit value; and
continuing the second part-function when the operating parameter again falls below the critical limit value.

6. The method according to claim 5, further comprising the step of interrupting the second part-function by setting the further counter increment (IB/E) to zero (IB/E=0) until the operating parameter again falls below the critical limit value.

7. The method according to claim 5, further comprising the step of interrupting the second part-function, if a current braking torque (MDBr) of an activated permanent brake exceeds a critical upper limit (for example 80%) related to a maximum braking capacity (MDBr_max) of the permanent brake.

8. The method according to claim 5, further comprising the step of interrupting the second part-function if a distance regulation system detects another motor vehicle driving in front the motor vehicle at a speed (vF/a) and at a distance (Δs), such that a time (Δts) to catch up with the another motor vehicle is shorter than a critical catch-up time (Δtkrit) (Δts<Δtkrit).

9. The method according to claim 1, further comprising the step of calculating the road inclination (NFB) from a current drag torque (MM<0) of a drive motor, a current braking torque (MDBr) of a permanent brake, a current driving speed (vF) and a current driving acceleration (aF) using a movement equation for a vehicle.

10. A method of controlling an automated multi-step shift transmission arranged in a drivetrain of a motor vehicle in the force flow between a drive motor and an axle drive of either a drive axle or a transfer box, such that a current road inclination (NFB) is determined and after driving onto a downhill stretch, to increase braking action of at least one of the drive motor and a permanent brake, a shift is carried out to a lower gear and at the latest after either a transition to a traction operation or a driving onto level ground a shift is carried out to a higher gear, the method comprising the steps of:
  starting a recognition function for detecting a downhill run-out at the latest after at least one of driving onto the downhill stretch and the transition to a thrust operation;
  carrying out a shift to a higher gear while still in the thrust operation (thrust upshift) before at least one of driving onto the level ground and the transition to the traction operation, if a downhill run-out is detected;
  defining the recognition function as a two part-function with a first part-function for detecting a downhill stretch and a second part-function for detecting level ground;
  starting the first part-function at the latest after at least one of driving onto the downhill stretch and transitioning to the thrust operation;
  ending the first part-function;
  starting the second part-function if a downhill gradient is detected by the first part-function;
  ending the second part-function;
  initiating the shift to a higher gear if a level stretch ground is detected by the second part-function;
  starting the second part-function (observation of the presence of a level stretch);
  setting a further observation counter (ZB/E) to a positive starting value (ZB/E_0 (ZB/E=ZB/E_0>0, initialization));
  determining the current road inclination (NFB);
  determining a further current counter increment (IB/E) as a function of the current road inclination (NFB (IB/E=f (NFB))), such that a road inclination (NFB) with an absolute value outside either an inclination limit value (±NGr) close to zero or within a limit value range related thereto (|NFB|>|±NGr|) gives a positive counter increment (IB/E>0), an absolute road inclination (NFB) approximately equal to the inclination limit value (±NGr (|NFB|≈|±NGr|)) gives a zero increment (IB/E=0) and an absolute road inclination (NFB) that is within either the inclination limit value or the limit value range related thereto (|NFB|<|±NGr|) gives a negative counter increment (IB/E<0);
  adding the further counter increment (IB/E) to the further observation counter (ZB/E (ZB/E=ZB/E+IB/E));
  ending the second part-function, when the further observation counter (ZB/E) one of reaches or falls below the value of zero (ZB/E≦0, level ground considered to have been recognized);
  repeating the steps of the second part-function (observation of the presence of a level stretch), except for the step of starting the second part-function and the step of setting the further observation counter in a fixed time cycle until a level stretch of road is detected;
  interrupting the second part-function, if a measured operating parameter with a low risk potential one of temporarily reaches or exceeds a critical limit value;
  continuing the second part-function when the operating parameter again falls below the critical limit value; and
  discontinuing the second part-function if a duration (Δtfr) of the interrupted status one of reaches or exceeds a predetermined duration limit (ΔtGr), (Δtfr>ΔtGr), and restarting the first part-function when the starting conditions are again fulfilled.

11. A method of controlling an automated multi-step shift transmission arranged in a drivetrain of a motor vehicle in the force flow between a drive motor and an axle drive of either a drive axle or a transfer box, such that a current road inclination (NFB) is determined and after driving onto a downhill stretch, to increase braking action of at least one of the drive motor and a permanent brake, a shift is carried out to a lower gear and at the latest after either a transition to a traction operation or a driving onto level ground a shift is carried out to a higher gear, the method comprising the steps of:
  starting a recognition function for detecting a downhill run-out at the latest after at least one of driving onto the downhill stretch and the transition to a thrust operation;
  carrying out a shift to a higher gear while still in the thrust operation (thrust upshift) before at least one of driving onto the level ground and the transition to the traction operation, if a downhill run-out is detected;
  defining the recognition function as a two part-function with a first part-function for detecting a downhill stretch and a second part-function for detecting level ground;
  starting the first part-function at the latest after at least one of driving onto the downhill stretch and transitioning to the thrust operation;
  ending the first part-function;
  starting the second part-function if a downhill gradient is detected by the first part-function;
  ending the second part-function;
  initiating the shift to a higher gear if a level stretch ground is detected by the second part-function; and
  discontinuing the second part-function if a measured operating parameter with a high risk potential changes substantially, and restarting the first part-function when the starting conditions are again fulfilled.

12. The method according to claim 11, further comprising the step of discontinuing the second part-function if one of a non-engaged forward gear and a shift of the multi-step shift transmission is detected.

13. The method according to claim 11, further comprising the step of discontinuing the second part-function if actuation of the service brakes is detected (xBP>0, pBr>0).

14. The method according to claim 11, further comprising the step of discontinuing the second part-function if traction operation of a drive motor is detected (MM>0).

* * * * *